(12) United States Patent
Marañón Maroto et al.

(10) Patent No.: US 12,516,034 B2
(45) Date of Patent: Jan. 6, 2026

(54) PROCESS FOR PREPARING HIGH-DENSITY QUERCETIN

(71) Applicant: TRADICHEM INDUSTRIAL SERVICES, S.L., Alcobendas (ES)

(72) Inventors: José Ángel Marañón Maroto, Hoyo de Manzanares (ES); Patricia Moreno Puente, Madrid (ES); Cristina Lozano Martín, Rivas-Vaciamadrid (ES); María Mancha Avellán, Madrid (ES); David Muñoz Plaza, Madrid (ES); Carlos Ramírez Borrego, Madrid (ES)

(73) Assignee: TRADICHEM INDUSTRIAL SERVICES, S.L., Alcobendas (ES)

( * ) Notice: Subject to any disclaimer, the term of this patent is extended or adjusted under 35 U.S.C. 154(b) by 64 days.

(21) Appl. No.: 17/859,656

(22) Filed: Jul. 7, 2022

(65) Prior Publication Data

US 2023/0399305 A1    Dec. 14, 2023

(30) Foreign Application Priority Data

Jun. 8, 2022  (EP) ..................... 22382549

(51) Int. Cl.
| | |
|---|---|
| *C07D 311/30* | (2006.01) |
| *A23L 33/10* | (2016.01) |
| *A61K 8/49* | (2006.01) |
| *A61Q 19/00* | (2006.01) |

(52) U.S. Cl.
CPC ............ *C07D 311/30* (2013.01); *A61K 8/498* (2013.01); *A61K 2800/10* (2013.01); *A61K 2800/805* (2013.01)

(58) Field of Classification Search
CPC .. C07D 311/30; A61K 8/498; A61K 2800/10; A61K 2800/805; A61K 9/1688; A23L 33/10; A61Q 19/00
See application file for complete search history.

(56) References Cited

U.S. PATENT DOCUMENTS

2005/0048143 A1   3/2005   McAnalley et al.

FOREIGN PATENT DOCUMENTS

| EP | 0 414 115 A1 | 2/1991 | |
|---|---|---|---|
| EP | 3 705 117 A1 | 9/2020 | |
| EP | 3705475 A1 * | 9/2020 | ........... A61K 31/405 |

OTHER PUBLICATIONS

Quercegen Pharmaceuticals LLC, Business Wire , Feb. 3, 2011, Retrieved on May 1, 2024, https://www.businesswire.com/news/home/20110203006895/en/Quercegen-Pharmaceuticals-LLC-Obtains-FDA-GRAS-Notified-Status-for-Its-QU995%E2%84%A2-Quercetin-with-Purity-Greater-Than-99.5. (Year: 2011).*
Azeem et al., "An insight into anticancer, antioxidant, antimicrobial, antidiabetic and anti-inflammatory effects of quercetin: a review", Polymer Bulletin, Jan. 30, 2022, pp. 1-22 (22 pages total).
Kovalevska et al., "Optimization of the composition of solid dispersion of quercetin", Current Issues in Pharmacy and Medical Sciences, Mar. 21, 2021, vol. 34, Issue 1, pp. 1-4 (4 pages total).
Sharma et al., "Formulation and Evaluation of Liquisolid Compact of Quercetin", Paideuma Journal, vol. XII, Issue XII 2019, pp. 424-433 (10 pages total).
Shetake et al., "Development and Evaluation of Quercetin Dispersible Tablets", Manipal Journal of Pharmaceutical Sciences, Sep. 2019, vol. 5, Issue 2, pp. 5-14 (11 pages total).
Vida et al., "Dietary quercetin supplements: Assessment of online product informations and quantitation of quercetin in the products by high-performance liquid chromatography", Phytotherapy Research, 2019, vol. 33, pp. 1912-1920 (9 pages total).
European Search Report dated Nov. 14, 2022 in European Application No. 22 38 2549.
T. Hatahet et al., "Quercetin topical application, from conventional dosage forms to nanodosage forms", European Journal of Pharmaceutics and Biopharmaceutics, 2016, vol. 108, pp. 41-53 (13 pages total).
Ruben Manuel Luciano Colunga Biancatelli et al., "Quercetin and Vitamin C: An Experimental, Synergistic Therapy for the Prevention and Treatment of SARS-CoV-2 Related Disease (COVID-19)", Frontiers in Immunology, 2020, vol. 11, pp. 1-11 (11 pages total).

* cited by examiner

*Primary Examiner* — Joseph K Mckane
*Assistant Examiner* — Sagar Patel
(74) *Attorney, Agent, or Firm* — Sughrue Mion, PLLC

(57) ABSTRACT

The invention relates to a process for preparing high-density quercetin of improved flowability comprising roller compaction of quercetin, wherein both the obtained high-density quercetin and the quercetin starting material have a purity of at least 95%. The invention also relates to the high-density quercetin obtainable with such process, to the use of high-density quercetin for preparing pharmaceutical dosage forms, to pharmaceutical dosage forms comprising high-density quercetin as active ingredient, and to their use in therapy and in cosmetics.

11 Claims, 1 Drawing Sheet

PROCESS FOR PREPARING HIGH-DENSITY QUERCETIN

TECHNICAL FIELD

The present invention relates to a process for preparing high-density quercetin. The obtained high-density quercetin granules have improved flowability and are advantageous for manufacturing quercetin pharmaceutical dosage forms.

TECHNICAL BACKGROUND

Quercetin is a polyphenolic flavonoid (3,3',4',5,7-pentahydroxyflavone), which is present in nature, mainly in the form of glycosides, in a variety of fruits and vegetables, including apples, berries, *Brassica* vegetables, capers, grapes, onions, shallots, tea and tomatoes, among others, as well as in many seeds, nuts, flowers, barks and leaves. Quercetin is therefore present in normal human diet, with different intakes depending on diet habits.

Many therapeutic uses of quercetin have been disclosed in the literature, as antioxidant, antimicrobial, antidiabetic, anticancerous and anti-inflammatory agent (Azeem et al., Polym. Bull., 2022, doi: 10.1007/s00289-022-04091-8).

Due to its wide range of health benefits, quercetin is available as dietary supplement, for example, in the form of tablets or capsules, for administering daily doses which generally range from 250 mg/day up to 4000 mg/day of quercetin (Vida et al., Phytotherapy Res., 2019, 1912-1920).

However, the manufacture of such quercetin dosage forms entails difficulties due to the poor flowability of this substance.

Hence, for example, the low flowability and compressibility of quercetin makes it necessary to use relatively high amount of formulation excipients in order to overcome these deficiencies. Thus, the tablets and capsules available in the market, despite the fact of having high quercetin strengths, comprise also high proportion of excipients, ranging from about 20 wt % to about 70 wt %, relative to the total weight of the dosage form (Vida et al., op. cit., Table 3).

Furthermore, the poor flow properties of quercetin make it difficult its handling during the manufacturing process of dosage forms, which is also a serious disadvantage from the industrial point of view, for example, in terms of product loses and increased production times. Moreover, the uniformity of the manufactured dosage forms may be also hampered due to quercetin low flowability.

Another challenge for the development of quercetin dosage forms is the low water solubility of this substance, which also results in poor bioavailability.

Several proposals have been disclosed in the prior art in order to face these disadvantages.

Thus, for example, in the article Sharma et al., Paideuma J., 2019, 424-433, it is disclosed a formulation of quercetin in the form of capsules where quercetin is first formulated as a "liquisolid compact". To this end, quercetin is dissolved in propyleneglycol, and then added to crystalline cellulose (carrier), hypromellose (coating material) and sodium starch glycolate (disintegrant), the blend is thoroughly mixed, dried and filled into the capsules. The obtained compacted powder has improved flowability and enhanced solubility.

In the article Shetake et al., Manipal J. Pharm. Sci., 2019, 4 (2), 5-14, quercetin dispersible tablets of improved solubility and bioavailability are disclosed. The tablets are prepared by direct compression of a powder preformulation mixture comprising a complex of quercetin with a solubilizing polymer (prepared in advance by hot melt extrusion), a disintegrant, magnesium stearate as lubricant, talc as glidant, and microcrystalline cellulose as diluent. Each tablet comprises 200 mg of active ingredient (quercetin), while the total weight of the tablet is 750 mg. The powder preformulation mixture allows for improved flow properties, compared to the API.

In the article Kovalevska et al., Curr. Issues Pharm. Med. Sci., 2021, 34 (1), 1-4, it is disclosed the preparation of quercetin tablets made of quercetin solid dispersions with carriers such as polyethyleneoxide-6000, β-cyclodextrin and polyvinylpyrrolidone, in a ratio quercetin:carrier of 1:1 and 1:2.

Despite the proposals available so far in the art, there is still the need of a simple and effective process for obtaining quercetin with improved flowability and compressibility. An improvement in the manufacture of quercetin dosage forms is also desirable, for example, by reducing or even avoiding the use formulation excipients, avoiding burdensome manufacturing processes and improving their manufacturing efficiency.

OBJECT OF THE INVENTION

The object of the present invention is a process for preparing high-density quercetin.

Another aspect of the invention is high-density quercetin obtainable with such process.

Another aspect of the invention is the use of the high-density quercetin for the preparation of pharmaceutical dosage forms.

Another aspect of the invention is a pharmaceutical dosage form comprising the high-density quercetin.

Another aspect of the invention is a dosage form comprising high-density quercetin for use in therapy.

Another aspect of the invention is cosmetic use of a dosage form comprising high-density quercetin.

DETAILED DESCRIPTION OF THE INVENTION

Figure 1:
FIG. 1 shows a picture of non-compacted quercetin starting material used in Example 1 and FIG. 2 shows a picture of the compacted quercetin granules obtained according to the process of Example 1.

The object of the present invention is a process for preparing high-density quercetin comprising roller compaction of quercetin, wherein both the high-density quercetin and the quercetin starting material have a purity of at least 95%.

The authors of the present invention have found a simple method for obtaining high-density quercetin, by roller compacting standard, commercially available quercetin. Surprisingly, the compacted high-density quercetin obtained with the process of the invention has outstanding flow properties, in particular, it is highly flowable and not sticky, which allows for the preparation of pharmaceutical dosage forms with better content uniformity and the use of less and even no excipients in the formulations. It also allows for improved efficiency in the industrial manufacturing of the pharmaceutical dosage forms.

Along the present description, as well as in the claims, singular expressions, generally preceded by the articles "a", "an" or "the", are intended to include the plural forms as well, unless the context clearly indicates otherwise.

The terms "about" or "approximately" referred to amounts, as used herein, are meant to include the exact amount and also a certain deviation around the stated amount, namely of ±5%.

Unless otherwise indicated, the stated percentages are always weight percentages.

The numerical ranges disclosed herein are meant to include any number falling within the ranges and also the lower and upper limits.

Quercetin

Quercetin (3,3',4',5,7-pentahydroxyflavone, also known as 2-(3,4-dihydroxyphenyl)-3,5,7-trihydroxy-4H-1-benzopyran-4-one, CAS number 117-39-5) is a polyphenolic flavonoid found in many fruits and vegetables, which has the following formula:

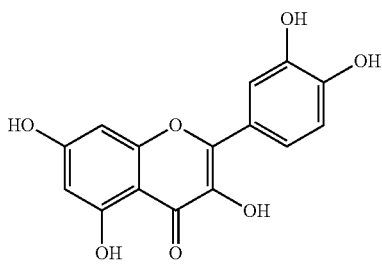 [SMILES: O=c1c(O)c(-c2ccc(O)c(O)c2)oc2cc(O)cc(O)c12]

According to the present invention, the denomination quercetin is also meant to include solvated forms of quercetin, in particular, hydrated forms, such as quercetin monohydrate or quercetin dihydrate, for example.

In one embodiment, quercetin is non-solvated, non-hydrated quercetin. In another embodiment, quercetin is quercetin dihydrate (CAS number 6151-25-3).

The term "high-density quercetin", as used herein, means quercetin that has higher density than conventional, non-compacted, commercially available quercetin, which is used as starting material.

Conventional quercetin has generally a bulk density of less than 0.45 g/ml, usually less than 0.40 g/ml, and typically lower, of less than 0.35 g/ml or less than 0.30 g/ml, for example, comprised between 0.18 g/ml and 0.40 g/ml, typically comprised between 0.18 g/ml and 0.25 g/ml.

In particular, "high-density quercetin", as used herein, means, for example, quercetin having a bulk density of more than 0.45 g/ml. It has typically even higher bulk density, for example, of more than 0.50 g/ml, or more than 0.55 g/ml, or more than 0.60 g/ml. It may have, for example, a bulk density comprised between 0.50 g/ml and 0.80 g/ml, or comprised between 0.55 g/ml and 0.75 g/ml, or comprised between 0.60 g/ml and 0.70 g/ml.

The terms "high-density quercetin" and "compacted quercetin" are used interchangeably herein.

Non-compacted quercetin, which is the starting material for the process of the present invention, may be obtained from different sources and procedures, for example, can be obtained from natural sources, namely, from plants, typically via extraction of the quercetin glycosides followed by hydrolysis to release the aglycone and subsequent purification to yield purified crystalline quercetin. Natural sources of quercetin are well-known, including many vegetables and fruits, for example, apples, berries, *Brassica* vegetables, capers, grapes, onions, shallots, and tomatoes, among others, as well as many seeds, nuts, flowers, barks and leaves. Particularly suitable sources of quercetin are, for example, flower buds of Japanese pagoda tree (*Sophora japonica* L.) and beans of Fava d'Anta tree (*Dimorphandra mollis* or *Dimorphandra gardeneriana*). Quercetin can also be obtained by chemical synthesis, for example, as disclosed in Shakhova et al., Zh. Obshch. Khim., 1962, 32, 390-396.

Quercetin is widely commercially available from several vendors. Quercetin of any source may be used as starting material, as long as it has enough purity, namely, of at least 95%.

Said non-compacted quercetin starting material is generally in the form of yellow powder, comprising fine quercetin particles. Said quercetin has a damp and agglomerated appearance and has low flowability. Its bulk (or apparent) density is generally less than 0.45 g/ml, more commonly less than 0.40 g/ml, and even lower, of less than 0.35 g/ml or less than 0.30 g/ml, for example, generally comprised between 0.18 g/ml and 0.40 g/ml, typically comprised between 0.18 g/ml and 0.25 g/ml. Its tapped (or compacted) density is typically less than 0.50 g/ml, more commonly less than 0.48 g/ml, generally comprised between 0.40 g/ml and 0.45 g/ml.

Non-compacted, commercially available quercetin used for the preparation of compacted quercetin, according to the process of the present invention, is typically a powder of fine particle size, for example, with at least 95% of particles having particle size of less than 500 microns, or less than 400 microns, or less than 300 microns, or less than 200 microns, as determined, for example, by sieving through a mesh of specified size.

Non-compacted quercetin used as starting material, as well as the compacted quercetin obtained with the process of the invention, is substantially pure, namely, it has a purity of at least 95%, i.e., the content of quercetin substance in the quercetin sample, as determined, for example, by HPLC, is of at least 95%. Preferably, the purity of quercetin, both in the starting material used for the process of the invention and in the compacted quercetin obtained therefrom, is of at least 95.5%, more preferably of at least 96.0%, still more preferably of at least 96.5%, still more preferably of at least 97.0%, still more preferably of at least 97.5%, still more preferably of at least 98.0%, still more preferably of at least 98.5%, still more preferably of at least 99.0%, and still more preferably of at least 99.5%, or about 100%.

Along the present description, as well as in the claims, both non-compacted quercetin used as starting material and high-density quercetin obtained with the process of the invention may be referred to as "substantially pure", wherein "substantially pure" means a purity as specified above.

The purity degree of quercetin can be determined using methods known in the art, for example, by HPLC, for example, as disclosed in Vida R G et al., Dietary quercetin supplements: Assessment of online product informations and quantitation of quercetin in the products by high-performance liquid chromatography, Phytother Res., 2019, 33 (7), 1912-1920.

The possible small amount of impurities present in the quercetin starting material are mainly related to quercetin derived products, for example, possible small amounts of degradation products of quercetin than can be generated during storage, or minor impurities related to its chemical synthesis, or minor remaining impurities after the extraction process from plant sources, for example.

As shown in Example 2, the purity of the compacted quercetin granules obtained according to the process of the invention is substantially the same as the purity of the quercetin starting material. It is due to the fact that no additional substances are added during the compaction and it also shows that the compaction process of the invention does not alter the chemical composition of quercetin starting material.

It is remarkable that, according to the process of the present invention, quercetin is compacted alone, that is to say, it is not mixed with any other substance for performing the roller compaction process of the present invention, namely, it is not mixed with any excipient or vehicle.

Compaction Process

Non-compacted, commercially available quercetin, as defined above, is used as starting material to prepare compacted quercetin, according to the process of the present invention.

The compaction process is performed using the roller compaction technology, which is well-known in the pharmaceutical field, namely, for the dry granulation of pharmaceutical powder mixtures. Such technology is widely described in different reference manuals in the art, for example, in R. W. Miller, *Roller Compaction Technology*, in: *Handbook of Pharmaceutical Granulation Technology*, Editor D. M. Parikh, Third Edition, Informa Healthcare USA, 2010, Chapter 8, 163-182. Briefly, in the roller compaction process, the powder being compacted is squeezed between two counter-rotating rolls to form a compressed sheet, which is subsequently milled into granules.

Roller compaction machines are well known in the art and are commercially available through many different companies, for example, Eurotab Bonals, Gerteis Maschinen+ Processengineering, Freund Corporation, AlexanderWerk, Powtec, Hosokawa Alpine or L.B. Bohle Maschinen and Verfahrenmany, among many others.

As is well-known in the art, the roller compaction machines, or roller compactors, typically comprise a main roller unit connected with a feeding system, for feeding the starting material to be compressed into the roller unit, and are connected to a granulating/milling system, for milling the compacted sheet exiting from the rollers.

The roller compactors available in the market may be characterized according to several parameters, for example, the type of feeding system, the range of compacting forces, the roll speed range, the diameter and the width (also referred to as the length) of the rolls, among others.

Some of these parameters can be adjusted during the compaction process in order to optimize the results, for example, the feed speed, roll speed, roll pressure, roll gap and mill speed.

As is well-known in the art, the feeding system in the roller compactor has the task of feeding the powder to be compacted to the rolls and ensures a uniform flow of material in order to continuously fill the nip between the rolls as they rotate. It can be a gravity feeder, wherein the powder is fed vertically by gravity, or a force feeder, wherein the powder is pushed towards the rolls by one or several screws. Preferably, screw feeding is used in the present invention, and the feeder can be vertical, horizontal or inclined. In one embodiment, the screw feeder is vertical and is situated in the upper part of the equipment, over the rolls. The screw feeder may be a hopper or analogous container containing an endless screw.

The feed speed can be adjusted, preferably to a constant feed speed, for example, by adjusting the rotation speed of the endless screw. Typically, the screw rotation speed is comprised between about 0.5 and about 7.0 rad/s, or preferably between 1.0 and 6.0 rad/s.

Typically, non-compacted quercetin raw material is sent for compaction into the screw feeder from another hopper or reservoir containing the product, for example, using vacuum for sucking the powder and sending it to the screw feeder in a controlled way. The sucking of the raw material and its delivery into the screw feeder can be controlled in an automatic way, for example, by placing a probe inside the feeder that activates the feeding of the raw material when necessary.

The roller unit consists of two equal diameter counter rotating rolls through which the powder is passed to get compacted. The two rolls can be mounted in horizontal, vertical or inclined position.

Typically, the roll diameter may range from about 80 to about 450 mm, depending on the roller compactor used. The roll diameter of the roller compactor to be used is not crucial, and all are suitable for performing the process of the current invention. For example, roll diameter of 100-250 mm is particularly suitable.

Typically, the roll width (also referred to as roll length) may range from about 20 to about 120 mm, and any width may be suitable for performing the method of the present invention. The higher the width of the rollers, the higher the amount of quercetin that can be processed per unit of time. For example, widths comprised between 50 and 100 mm are suitable.

The roll speed can also be adjusted and typically may range from about rad/s to about 3.7 rad/s. In one embodiment of the invention the roll speed is comprised between 0.5 and 2.0 rad/s, more preferably comprised between 0.7 and 1.6 rad/s, and still more preferably comprised between 1.0 and 1.3 rad/s, for example, is about 1.0 rad/s, or is about 1.1 rad/s, or is about 1.2 rad/s, or is about 1.3 rad/s.

Another adjustable parameter is the roll gap, i.e., the distance between the two rolls. It typically ranges from about 0.2 mm to about 2 mm, preferably from about 0.2 mm to about 1.5 mm, more preferably from about 0.3 mm to about 1.0 mm, still more preferably from about 0.4 mm to about 0.8 mm, and still more preferably from about 0.4 mm to about 0.6 mm. In particular embodiments of the invention, the roll gap is selected from about 0.4 mm, about 0.5 mm, about 0.6 mm, about 0.7 mm and about 0.8 mm. In one embodiment, the roll gap is about 0.5 mm.

Generally, one roll is fixed, while the other is movable and exerts pressure on the fixed roll by means of a hydraulic pressure control system. The horizontal pressure/force between rolls can be also adjusted to optimize the properties of the end-product.

The roller compactors available in the market may provide a wide range of compacting forces, generally ranging from about 10 kN to about 200 kN or higher. Typically, the compacting force is comprised between 50 kN and 200 kN, preferably between 70 kN and 170 kN, more preferably between 100 kN and 155 Kn, still more preferably between 120 kN and 145 kN, and still more preferably comprised between 125 kN and 140 kN.

The roll force applied during the compression may be suitably expressed, for example, as force per unit of roller length. Typically, the force per unit of roller length in the method of the invention may range from about 1 kN/cm to about 40 kN/cm, preferably from about 5 kN/cm to about 35 kN/cm, preferably from about 10 kN/cm to about 30 kN/cm, more preferably from about 15 kN/cm to about 25 kN/cm, still more preferably from about 16 kN/cm to about 22 kN/cm, and still more preferably from about 17 kN/cm to about 20 kN/cm.

The roll surface may be either smooth or non-smooth, i.e., may have rough pattern surface, for example, fluted, grooved or knurled surface. The roll surface of the two rolls may be identical or different.

In one embodiment of the invention, both rolls have smooth surface. In another embodiment of the invention, one roll has a smooth surface and the other has a non-smooth surface, for example, fluted, grooved or knurled surface.

Once quercetin has been compacted, after passing through the two counter rotating rollers, it is transformed in a compressed sheet or ribbon, which is subsequently sent to the granulation/milling module, which is typically placed under the compacting rollers. Such granulation/milling module comprises one or more mills which break the compacted ribbon into compacted granules. Typically, after grinding, the granules are sieved through the suitable mesh size to obtain granules of the desired particle size. In this step of the compaction process, the speed of the granulation mill can also be adjusted. This speed is not critical, and is typically comprised in the range of from about 1.0 rad/s to about 60.0 rad/s, preferably from about 4.0 rad/s to about 52.0 rad/s, more preferably from about 7.0 rad/s to about 42.0 rad/s.

The temperature of quercetin during the compression process is also typically controlled, although this temperature is not critical for the process as quercetin is relatively stable to heating. The temperature is typically kept under certain fixed temperature, in order to avoid excessive heating of the equipment. Typically, the temperature is kept under 50° C., preferably, it is kept the range 10-50° C., more preferably in the range 20-45° C.

The temperature during compression can be kept under control by using any suitable refrigerating system and typically a temperature sensor. For example, the rollers may advantageously comprise an internal circuit with a circulating refrigerating/heating fluid whose flow can be regulated in order to adjust the temperature to the desired value, and typically comprising a temperature sensor, for example, on the roller surface. Therefore, if the temperature reaches the maximum fixed temperature, the compaction process is typically temporarily stopped until the temperature descends, usually by starting the refrigerating system.

The temperature of the roller surface correlates well with the temperature of the product while it is being compressed between the rollers. Therefore, when the temperature of quercetin during the compacting process is stated, it means the measured temperature of the roller surface.

In one embodiment of the invention, quercetin is subjected to roller compaction using the following parameters:
- Roll speed comprised between 0.5 and 2.0 rad/s, more preferably comprised between 0.7 and 1.6 rad/s, and still more preferably comprised between 1.0 and 1.3 rad/s, for example, is about 1.0 rad/s, or is about 1.1 rad/s, or is about 1.2 rad/s, or is about 1.3 rad/s.
- Roll gap comprised between 0.2 mm and 2 mm, preferably between 0.2 mm and 1.5 mm, more preferably between 0.3 mm and 1.0 mm, still more preferably between 0.4 mm and 0.8 mm, and still more preferably from 0.4 mm to 0.6 mm, for example, about 0.4 mm or about 0.5 mm, or about mm or about 0.7 mm or about 0.8 mm.
- Roll force between the rolls comprised between 50 kN and 200 kN, preferably between 70 kN and 170 kN, more preferably between 100 kN and 155 kN, still more preferably between 120 kN and 145 Kn, and still more preferably comprised between 125 kN and 140 kN; and/or roll force per unit of roller length comprised between 1 kN/cm and 40 kN/cm, preferably between 5 kN/cm and 35 kN/cm, more preferably between 10 kN/cm and 30 kN/cm, still more preferably between 15 kN/cm and 25 kN/cm, still more preferably between 16 kN/cm and 22 kN/cm, and still more preferably is comprised between 17 kN/cm and 20 kN/cm;

wherein preferably:
- the screw rotating speed of the feeding system is comprised between 0.5 rad/s and 7.0 rad/s;
- the speed of the granulation mill is comprised between 4.0 rad/s and 52.0 rad/s, more preferably comprised between 7.0 rad/s and 42.0 rad/s; and
- the temperature of quercetin during compaction is maintained under 50° C., preferably in the range 10-50° C., more preferably in the range 20-45° C.

High-Density Quercetin

Another aspect of the invention is the high-density quercetin obtainable with the process of the present invention, as disclosed above. The high-density quercetin is substantially pure, namely, with a purity of at least 95%, as specified above.

The compacted high-density quercetin obtainable with the process according to the present invention shows improved flowability compared to the commercial, non-compacted quercetin.

In Example 2, the flowability properties of the high-density quercetin granules of the present invention are compared to those of non-compacted, standard quercetin. The measured properties compared are the bulk density, tapped density and the angle of repose, as well as and some parameters that are derived therefrom, such as the Carr index and Hausner ratio, which are well known in the art.

The bulk density, also called apparent density, can be defined as the ratio of the mass to the volume of an untapped powder sample, as "poured". The bulk density is given in grams per millilitre (g/ml) and is typically calculated by "pouring" a known mass of powder into a graduated cylinder.

On the other hand, tapped density, also called compacted density, of a powder is the ratio of the mass of the powder to the volume occupied by the powder after it has been tapped for a defined period of time. Tapped density is measured by first gently introducing a known sample mass into a graduated cylinder and carefully levelling the powder without compacting it. The cylinder is then mechanically tapped by raising the cylinder and allowing it to drop under its own weight using a suitable mechanical tapped density tester that provides a suitable fixed drop distance and nominal drop rate Bulk density and tapped density can be measured according to the method disclosed in the European Pharmacopoeia section 2.9.34 (*Bulk density and tapped density of powders*), for example, the bulk density may be measured using the PT-SV100 Scott Volumeter and the tapped density may be measured using the PT-TD200 Tap Density Tester (Pharma Test Apparatebau AG, Germany).

The Carr index, also called Carr's index or compressibility index, is calculated according to the following formula:

$$\text{Carr index} = \frac{\text{Density (tapped)} - \text{Density (bulk)}}{\text{Density (tapped)}} \times 100$$

Free flowing powders have smaller values of the Carr index than poor flowing powders. In general, a Carr index greater than 25 is considered to be an indication of poor flowability, and below 15, of good flowability.

Hausner ratio is also predictive of powder flow, and is calculated according to the following formula:

$$\text{Hausner ratio} = \frac{\text{Density (tapped)}}{\text{Density (bulk)}} \times 100$$

In this case, a Hausner ratio greater than 1.34 is generally considered to be an indication of poor flowability.

The relationship between Carr index and/or Hausner ratio with powder flowability is well recognized in the art, for example, as disclosed by M. E. Aulton, in "Powder flow", chapter 12 of the well-recognized reference book in pharmaceutical technology "Aulton's Pharmaceutics. The design and manufacture of medicines", Fifth Edition 2018, M. E. Aulton and K. M. G. Taylor, Editors, Elsevier Ltd, as summarized in Table 1:

TABLE 1

| Type of flow | Carr index | Hausner ratio |
| --- | --- | --- |
| Excellent | 1-10 | 1.00-1.11 |
| Good | 11-15 | 1.12-1.18 |
| Fair | 16-20 | 1.19-1.25 |
| Passable | 21-25 | 1.26-1.34 |
| Poor | 26-31 | 1.35-1.45 |
| Very poor | 32-37 | 1.46-1.59 |
| Very, very poor | >37 | >1.59 |

The "angle of repose" is another parameter for indirectly quantifying powder flowability. It is the angle at which a material will rest on a stationary heap, specifically, is the angle formed by the heap slope and the horizontal plane. It may be calculated by different methods, commonly, just pouring the material on a flat surface. It also can be calculated as "drained angle of repose", as the angle measured on the internal conical face of a material which has been formed when drained from an orifice of a flat-bottomed container to the horizontal. A dynamic angle of repose can also be used, which is the angle to the horizontal of the free surface formed in a relatively slowly rotating drum (Aulton, op. cit., pg. 197).

In this case, the lower the value of the angle of repose, the higher the flowability of the material. It is generally considered that an angle of repose higher than 45 correlates with poor flowability, whereas an angle of repose under 30 correlates with excellent flowability.

As disclosed in Example 2, the compacted quercetin obtained according to the process of the present invention has excellent flowability, as shown by the values of the Carr index, Hausner ratio and the angle of repose.

Outstandingly, as shown in Example 2, the process of the present invention allows for the obtention of pure quercetin, having the same chemical identity as the starting material, but where the flowability of the product is changed from "very, very poor", according to the classification shown in Table 1, to "excellent". Indeed, in this particular example, the Carr index value is changed from 52.27 to 8.45 and the Hausner ratio from 2.10 to 1.09.

In particular, the method of the invention allows obtaining high-density quercetin having a Carr index lower than 15, preferably lower than 13, more preferably lower than 11, still more preferably equal to or lower than 10, for example comprised between 5 and 10.

Analogously, the method of the invention allows obtaining high-density quercetin having a Hausner ratio lower than 1.25, more preferably lower than 1.20, still more preferably lower than 1.18, still more preferably lower than 1.14, still more preferably lower than 1.12, still more preferably equal to or lower than 1.11, for example, comprised between 1.00 and 1.11.

As shown in Example 2, non-compacted, commercially available quercetin, when subjected to the process according to the present invention, undergoes a significant increase of its density; typically, the bulk density increases in about 200%, from a bulk density of about 0.2 g/ml of the starting non-compacted quercetin to a bulk density of about 0.6 g/ml.

In one embodiment, the process of the invention allows for an increase of the bulk density of quercetin of at least 50%, preferably of at least 75%, more preferably of at least 100%, still more preferably of at least 125%, still more preferably of at least 150%, still more preferably of at least 175%, or even higher, for example, of about 200%.

According to the process of the present invention, the compacted high-density quercetin has typically a bulk density of more than 0.45 g/ml, preferably of more than 0.50 g/ml, still more preferably of more than 0.55 g/ml, and still more preferably of more than 0.60 g/ml. Typically, the bulk density of the compacted quercetin is in the range 0.45-0.80 g/ml, preferably in the range 0.50-0.80 g/ml, more preferably in the range 0.55-0.80 g/ml, still more preferably in the range 0.55-0.75 g/ml, still more preferably in the range 0.60-0.75 g/ml and still more preferably in the range 0.60-0.70 g/ml Furthermore, according to the process of the present invention, the compacted high-density quercetin has typically a tapped density of more than 0.55 g/ml, preferably of more than 0.60 g/ml, more preferably of more than 0.65 g/ml, and still more preferably of more than 0.70 g/ml. Typically, the tapped density of the compacted quercetin is in the range 0.55-0.85 g/ml, preferably in the range 0.60-0.80 g/ml, more preferably in the range 0.65-0.75 g/ml.

The high-density quercetin obtained with the process of the present invention provides many practical advantages for the manufacturing of pharmaceutical dosage forms due to its improved flow properties.

Thus, for example, as shown in Example 3, the efficiency of the manufacturing of pharmaceutical dosage forms is highly increased, due to the fact that the compacted quercetin granules flow easily and do not stick to the walls of the containers. Consequently, product loses are avoided, the operational yield is increased and production and cleaning times are reduced.

Furthermore, due to the high flowability of the compacted quercetin, there is no need to add flowability aid excipients, such as glidants or fillers, and, therefore, pharmaceutical dosage forms may be prepared containing less excipients. As shown in Example 3, capsules comprising only 5% of excipients (magnesium stearate) can be conveniently prepared, with high weight and content uniformity, whereas when conventional non-compacted quercetin is used, the capsules show reduced uniformity characteristics. It is even possible to formulate capsules or tablets containing 100% quercetin, i.e., without excipients, as shown in Examples 4 and 5, still maintaining good uniformity.

It is remarkable that, the quercetin dosage forms disclosed so far in the art have relatively high proportion of excipients and, particularly, no dosage form substantially without excipients has been disclosed so far. This is economically advantageous, as it allows savings in formulation excipients, which has direct impact in production costs, and is also therapeutically advantageous, as it allows reducing the size of the final dosage form, which is particularly relevant for active ingredients, such as quercetin, whose daily dosage may be high, of even more than 1 g.

Furthermore, surprisingly, it was found that the solubility of compacted quercetin and the solubility of the dosage forms containing it was improved, compared to standard, non-compacted quercetin. It is advantageous, as the poor solubility of quercetin is one of the drawbacks of this substance, as it impairs its biological availability and, consequently, its therapeutic activity.

The high-density quercetin of the present invention is typically in the form of granules, in contrast to the fine powder form of non-compacted quercetin starting material, that is to say, the high-density quercetin is generally formed by larger particles, compared to the finely divided non-compacted quercetin. Therefore, the high-density quercetin of the present invention may be also referred to herein as high-density (or compacted) granular quercetin or high-density (or compacted) quercetin granules.

The size of the granules of compacted quercetin is not critical. Optionally, the size of the compacted quercetin and can be adjusted, for example, by milling and sieving, using a sieve of suitable mesh size to obtain particles of the desired size, namely, under a specific size determined by the sieve opening. Typically, the mesh size of the sieve is adjusted to obtain particles of size equal to or less than 2000 microns, preferably equal to or less than 1800 microns, more preferably equal to or less than 1600 microns, still more preferably equal to or less than 1400 microns, still more preferably equal to or less than 1200 microns, and still more preferably equal to or less than 1000 microns. Combining sieves of suitable sizes, particles within specified desired size ranges may be prepared, for example, comprised between 400 and 2000 microns, preferably comprised between 500 and 1500 microns, more preferably comprised between 600 and 1200 microns, and still more preferably comprised between 700 and 1000 microns.

Pharmaceutical Dosage Forms

Another aspect of the invention is the use of the high-density quercetin of the present invention for the preparation of a pharmaceutical dosage form.

Another further aspect of the invention is a pharmaceutical dosage form comprising the high-density quercetin of the present invention and, optionally, at least one pharmaceutically acceptable excipient and/or vehicle.

Another aspect of the invention is a process for preparing a pharmaceutical dosage form comprising quercetin and, optionally, at least one pharmaceutically acceptable excipient and/or vehicle comprising a step of previously compacting substantially pure quercetin alone, i.e., without any excipient or vehicle, by roller compaction, according to the process of the present invention.

As discussed above, the compacted quercetin obtained with the process of the present invention, has improved flowability and higher density, and can be advantageously used for the preparation of pharmaceutical dosage forms.

Hence, the improved flowability is an advantage for the manufacturing of pharmaceutical dosage forms, as the product flows more easily, does not stick to the walls of vessels or blenders, or to the punches and dies of tableting machines, for example, therefore avoiding product loses and improving the equipment maintenance. Furthermore, the improved flowability of quercetin is also an advantage for preparing powder pre-mixtures with excipients, for example, for manufacturing tablets or capsules, avoiding segregation of the components and providing better homogeneity of the blend. For the same reason, it is possible to reduce, and even avoid, the use of formulation aids, namely, pharmaceutical excipients. This fact, together with the higher density of compacted quercetin enables not only savings in formulation excipients but also a reduction of the volume of the final dosage forms, particularly, oral dosage forms such as capsules or tablets, for a given active ingredient strength.

Furthermore, the improved compressibility (related to its low Carr index) of compacted quercetin particles enables the preparation of tablets of higher hardness by direct compression.

Substantially pure compacted quercetin is the active ingredient of the pharmaceutical dosage forms disclosed herein. Optionally, the composition can contain one or more additional active ingredients to reinforce the desired activity of the composition.

Typically, the pharmaceutical dosage form comprising compacted quercetin as active ingredient, according to the present invention can be any conventional dosage form which can be prepared using methods that are well known to the person skilled in the art, as those disclosed in handbooks of pharmaceutical technology, for example, in the book J. P Remington and A. R. Genaro, Remington The Science and Practice of Pharmacy, $20^{th}$ edition, Lippincott, Williams & Wilkins, Philadelphia, 2000 [ISBN: 0-683-306472] or in the book M. E. Aulton and K. M. G. Taylor, Aulton's Pharmaceutics, the design and manufacture of medicines, $5^{th}$ edition, Elsevier Ltd, 2018 [ISBN: 978-0-7020-7005-1], or in the book A. K. Dash, S. Singh and J. Tolman, Pharmaceutics. Basic principles and application to pharmacy practice, Academic Press, Elsevier, 2014 [ISBN: 978-0-12-386890-9].

The excipients suitable to be used in the pharmaceutical dosage forms of the present invention are also well known to those skilled in pharmaceutical technology and are described, for example, in the book R. C. Rowe, P. J. Sheskey and P. J. Weller, Handbook of Pharmaceutical Excipients, Sixth Edition, Pharmaceutical Press, 2009.

Suitable formulations for compacted quercetin include not only oral, but also injectable and topical formulations.

Along the present description, as well as in the claims, the terms "pharmaceutical dosage form" and "dosage form" are interchangeably used. The term "pharmaceutical dosage form" encompasses any dosage form comprising quercetin, and this term is also meant to include those dosage forms which are dietary supplements or cosmetics, rather than strictly medicaments. It is noted that, in general, the components and manufacturing processes of the formulations are substantially the same, irrespective that the final product can be classified either as a dietary supplement, a medication or a cosmetic composition.

Oral pharmaceutical dosage forms may be solid, such as tablets, capsules, powders or granules, said powders or granules typically in mono-dose sachets; or liquid, such as solutions, suspensions or syrups.

In one embodiment, the oral dosage form is a solid oral dosage form, which is selected from tablets, capsules, powders and granules, preferably is selected from tablets and capsules.

Due to the excellent flowability of compacted granular quercetin, less formulation excipients are required in the formulation of solid dosage forms. Typically, the quercetin solid dosage form according to the present invention comprises at least 70 wt % quercetin, preferably at least 75 wt % quercetin, more preferably at least 80 wt % quercetin, still more preferably at least 85 wt % quercetin, and still more preferably at least 90 wt % quercetin; in particular embodiments, it comprises at least 95 wt % quercetin, or at least 98 wt % quercetin, or even about 100 wt % quercetin. It is understood that the stated percentage of quercetin in capsules relates to the formulation inside the capsule, without including the weight of the capsule shell. For tablets, it relates to the formulation of the tablet core, i.e., not including the tablet coating, if present.

Tablets comprising the compacted quercetin of the present invention can be formulated using standard procedures, well known in the art. Preferably, tablets are prepared by direct compression taking advantage of the good compressibility of compacted quercetin, i.e., compacted quercetin is optionally mixed with suitable excipients and compressed without any previous granulation process. Alternatively, compacted quercetin can be previously granulated with additional excipients, either by wet granulation, fluid-bed granulation or dry granulation, and then optionally mixed with extra-granular excipients and compressed into tablets. Excipients typically used in the formulation of tablets are diluents, binding agents, glidants, lubricants, disintegrating agents, and mixtures thereof. Other additional excipients include sweetening agents, flavouring agents and colouring agents, for example.

Suitable diluents include calcium carbonate, calcium phosphate, calcium sulfate, cellulose acetate, dextrates, dextrins, dextrose, ethylcellulose, fructose, glyceryl palmitostearate, isomalt, kaolin, lactitol, lactose, magnesium carbonate, magnesium oxide, maltodextrins, maltose, mannitol, microcrystalline or powdered cellulose, pregelatinized starch, starch, sodium carbonate, sodium chloride, sorbitol and sucrose, among others, and mixtures thereof.

Suitable binding agents include acacia, agar, cellulose acetate phthalate, copovidone, dextrates, dextrin, dextrose, ethylcellulose, gelatin, glyceryl behenate, guar gum, hydroxyethyl cellulose, hydroxyethylmethyl cellulose, hydroxypropyl cellulose, hydroxypropylmethyl cellulose, methylcellulose, maltodextrin, microcrystalline cellulose, povidone, pregelatinized starch, sodium carboxymethylcellulose, starch, stearic acid and sucrose, among others, and mixtures thereof.

Suitable glidants include powdered cellulose, colloidal silicon dioxide, magnesium oxide, magnesium silicate, magnesium trisilicate, silicon dioxide, and talc, among others, and mixtures thereof.

Suitable lubricants include calcium stearate, glyceryl behenate, glyceryl palmitostearate, hydrogenated castor oil, magnesium stearate, myristic acid, palmitic acid, polyethylene glycol, sodium benzoate, sodium lauryl sulfate, sodium stearyl fumarate, stearic acid, and talc, among others, and mixtures thereof.

Suitable disintegrants include alginic acid, crospovidone, sodium croscarmellose, sodium starch glycolate, starch, and low-substituted hydroxypropyl cellulose, among others, and mixtures thereof.

Furthermore, tablets may be formulated either as conventional compressed tablets, or in other forms, for example, buccal, sublingual, chewable, sustained-release or orally-disintegrating tablets, by selecting suitable excipients and manufacturing processes, as are well known in the art.

Capsules, as is well known in the pharmaceutical field, are solid dosage forms in which the active substance is enclosed in either a hard or soft, soluble container or shell. The raw materials used in the manufacture of the shell are similar for both hard and soft gelatin capsules, while the proportions vary. The major component of a capsule shell is typically gelatin; other components include water, plasticizers, such as glycerol, sorbitol or propylene glycol, colorants, opacifiers, such as titanium dioxide, and preservatives. Hypromellose can alternatively be used as capsule shell material for hard capsules.

Hard capsules consist of two sections, one slipping over the other and thus enclosing the quercetin formulation, which is generally in solid form, as powder or granulate, or occasionally in liquid or semi-liquid form, while in soft gelatin capsules, also referred to as softgels, a continuous, one-piece, hermetically sealed gelatin shell surrounds the drug formulation, which is generally in liquid, suspension or semisolid form.

The powders or granules included within hard capsules comprise the compacted quercetin and, optionally, at least one pharmaceutically acceptable excipient, generally selected from diluents, lubricants and glidants, and mixtures thereof, which are well-known in the art, for example, those disclosed above for the formulation of tablets.

The term "powders" typically refers to intimate mixtures of finely divided active ingredient, optionally with one or more excipients. The active ingredient and the excipient(s) are mixed to obtain a homogeneous mixture, for example using trituration, spatulation, sifting or tumbling procedures, which are well-known in the art.

The term "granules" typically refers to larger particles, either containing the active ingredient alone, or aggregations of active ingredient particles with additional excipients, typically prepared by dry granulation, wet granulation or fluid-bed granulation procedures, which are also well known in the art. In one embodiment.

In one embodiment, the dosage form is a hard capsule comprising compacted quercetin in a proportion of at least 80 wt %, preferably at least 85 wt %, more preferably at least 90 wt %, still more preferably at least 95 wt %, and still more preferably at least 98 wt %, or even about 100 wt % quercetin. Furthermore, taking advantage of the excellent flowability of the compacted quercetin of the invention, the fill composition of the capsule is preferably prepared by simple mixture of compacted quercetin and the possible formulation excipients.

The fill compositions for soft gelatin capsules generally comprise the active ingredient, i.e., quercetin, dissolved or dispersed in a liquid vehicle. The vehicle is typically an oily liquid, for example, a vegetable oil, such as peanut oil, castor oil, olive oil, rapeseed oil, corn oil, sesame oil, sunflower oil or soybean oil, among others, or medium chain triglycerides (MCT), or mixtures thereof. Other liquid, non-oily, vehicles can also be used, for example, polyethylene glycols, isopropyl alcohol, propylene glycol, glycerol, polyglycerols, triacetin, glyceryl esters, sorbitan esters, sugar esters and polyglyceryl esters, among others, or mixtures thereof. The composition generally additionally comprises other excipients, acting as suspending agents and/or viscosity modifying agents, for example, hydrogenated vegetable oils, waxes, or ethylcellulose for oily vehicles and solid glycol esters for non-oily vehicles. Surfactants such as lecithin or polysorbate 80 may also be added to improve the dispersion of the suspended drug particles. Alternatively, the fill composition may be in the form of self-emulsifying lipophilic systems or microemulsion pre-concentrates, which typically comprise a lipophilic solvent, such as a vegetable oil or a medium chain triglyceride, and a surfactant, and optionally a co-solvent, such as ethanol or propyleneglycol.

Powders or granules for oral administration may be directly administered to the oral cavity to be swallowed or either they can be previously dissolved or dispersed in water or in other suitable liquid before being ingested. They may also be effervescent powders or granules.

The formulation and preparation of powders or granules for oral administration is analogous to the formulation and preparation of powders or granules for preparing tablets or for filling capsules, as discussed above. They typically comprise the active ingredient, i.e., quercetin, and typically at least one pharmaceutically acceptable excipient, generally selected from diluents, lubricants, glidants, binders, disintegrating agents, and mixtures thereof, which are well-known in the art, for example, those disclosed above for the formulation of tablets. They may contain also additional excipients, such as colouring and flavouring substances. Furthermore, as is well-known in the art, effervescent powders additionally contain acid substances, for example, citric acid, and carbonates or hydrogen carbonates which react rapidly in the presence of water and effervesce releasing carbon dioxide.

Powders or granules for oral administration are typically presented as mono-dose sachets. The sachets can be made of paper or either of aluminium or plastic laminates. Alternatively, powders/granules may be presented as multi-dose preparations in suitable containers, for example, bulk containers provided with a measuring device.

In one embodiment, the pharmaceutical dosage form comprising compacted quercetin of the present invention and optionally at least one pharmaceutically acceptable excipient is a solid form for oral administration selected from the group consisting of tablets, hard capsules, soft capsules, powders and granules. In one embodiment the pharmaceutical dosage form is selected from the group consisting of tablets and hard capsules.

Suitable liquid oral dosage forms typically include solutions, suspensions and syrups.

Oral solutions contain quercetin active substance dissolved in a vehicle, while syrups are oral aqueous solutions containing high concentrations of sucrose or other sugars. Sugar-free syrups are obtained by replacing sucrose with hydrogenated glucose, mannitol, sorbitol or xylitol, for example.

As quercetin is poorly soluble in water, the formulation strategies for formulating oral solutions or syrups include, for example, using water in combination with co-solvents, using a solubilizer, and/or encapsulating quercetin in the form of liposomes using suitable phospholipids, among others.

Oral suspensions contain quercetin dispersed, rather than dissolved, in a liquid medium.

Suitable excipients included in solutions and/or suspension are, for example, solubilizers, stabilizers, buffers, antioxidants, preservatives, flavouring agents, colouring agents, and sweetening agents, for example.

Suitable co-solvents include ethanol, propylene glycol, polyethylene glycol 300 or 400, sorbitol and glycerol, among others, and mixtures thereof.

Suitable solubilizing agents include cyclodextrins and surfactants, such as sorbitan esters, polyoxyethylene castor oil derivatives, polysorbates, sodium oleate, potassium oleate, or polyoxyethylene stearate, among others, and mixtures thereof.

Suitable preservatives include ascorbic acid, sorbic acid, benzalkonium chloride, benzyl alcohol, bronopol, parabens, sodium benzoate, sodium propionate, or thimerosal, among others, and mixtures thereof.

Suitable antioxidants include ascorbic acid, sodium sulphite, sodium bisulphite and sodium metabisulfite, among others, and mixtures thereof.

Suitable viscosity modifiers include acacia, alginic acid, bentonite, carbomers, carrageenan, gelatin, glycerol, hydroxyethyl cellulose, hydroxyethylmethyl cellulose, hydroxypropyl cellulose, maltodextrin, polyvinyl alcohol, sodium alginate, tragacanth, xanthan gum, gellan gum, guar gum, among others and mixtures thereof.

Suitable suspending agents include xanthan gum, guar gum, alginic acid, bentonite, carbomers, sodium or calcium carboxymethylcellulose, hydroxyethyl cellulose, hydroxypropyl cellulose, hydroxypropylmethyl cellulose, hydroxypropyl alginate, microcrystalline or powdered cellulose, anhydrous colloidal silica, dextrins, gelatins, kaolin, magnesium aluminium silicate, maltitol, povidone, sorbitan esters, or tragacanth, among others, and mixtures thereof.

Suitable flavouring agents include maltol, vanillin, ethyl vanillin, menthol, citric acid, fumaric acid, ethyl maltol, tartaric acid, peppermint, artificial or natural fruit aromas, among others, and mixtures thereof.

Suitable sweetening agents include sorbitol, maltitol, mannitol, dextrose, isomalt, maltose, xylitol, saccharin, sucrose, sucralose, aspartame, acesulfame potassium or trehalose, among others, and mixtures thereof.

Typically, such liquid dosage forms for oral use may be supplied as multi-dose or as single-dose preparations. Each dose from a multi-dose container is generally administered using a device suitable for measuring the prescribed volume. The measuring device may be, for example, a spoon, a cup, an oral syringe, or a dropper.

In one embodiment, the pharmaceutical dosage form comprising compacted quercetin of the present invention and at least one pharmaceutically acceptable excipient is a liquid formulation for oral administration selected from the group consisting of solutions, suspensions and syrups.

The compacted quercetin of the present invention can also be formulated as a parenteral composition, namely, for intravenous or intramuscular administration. Parenteral or injectable compositions, as is well-known in the art, are sterile formulations in the form of solution, emulsion or suspension, prepared by dissolution, emulsification or suspension of compacted quercetin active ingredient in water for injection, or, alternatively, in other vehicles. Alternatively, the injectable composition may be in the form of powder, for preparing the solution immediately before the administration by dissolving the powder in water for injection. As disclosed above, due to the low water solubility of quercetin, solubilizer substances may be needed in such formulations, for example, surfactants, such as fatty acid esters of polyoxyethylene or polyethoxylated sorbitan, among others, as well as co-solvents, such as ethyl alcohol, glycerol, polyethylene glycol, or propylene glycol, among others, and mixtures thereof.

Other suitable excipients that can be added to parenteral formulations include antimicrobials, such as benzalkonium chloride, benzyl alcohol, chlorobutanol, metacresol, parabens, phenol or thimerosal, among others, and mixtures thereof; antioxidants, such as ascorbic acid, cysteine, monothioglycerol, sodium bisulfite, sodium metabisulfite, tocopherols, among others, and mixtures thereof; buffers, such as acetates, citrates or phosphates, among others; chelating agents, such as salts of EDTA; and tonicity-adjusting agents, such as dextrose or sodium chloride, among others, or mixtures thereof; among others, and mixtures thereof.

In one embodiment, the pharmaceutical dosage form comprising compacted quercetin of the present invention and at least one pharmaceutically acceptable excipient is an injectable composition.

Compacted quercetin can also be formulated as a topical composition, namely, in liquid or semisolid form. Liquid topical compositions include lotions, liniments and tinctures, and they are typically prepared by dissolving or dispersing Quercetin in a suitable carrier such as, for example, water, alcohols, glycols, or mixtures thereof, optionally including some solubilizing aid, as disclosed above. Topical liquid compositions may be directly applied on the area of skin or mucosal tissue to be treated or, alternatively, they can be used to impregnate a dressing or bandage to be applied on the treated area.

Semisolid topical compositions include creams, gels, ointments and pastes. Typically, they are prepared by dissolving or suspending quercetin in a suitable pharmaceutically acceptable carrier. This carrier is selected from water, a non-aqueous water miscible carrier, such as for example ethanol or isopropanol, and a non-aqueous water-immiscible carrier, such as for example paraffin oil. Preferably, semisolid topical compositions for quercetin are in the form of creams. As is well-known in the art, creams are semisolid emulsions, which are classified as oil-in-water (o/w) and water-in-oil (w/o) types depending on whether the continuous phase is oil or water. Typically, such semisolid compositions for topical administration contain a pharmaceutically acceptable excipient such as, for example, surfactant and emulsifier agents, lipidic and emollient compounds, consistency factors and thickening agents, stabilizers, hydrotropes, preservative agents, essences, colouring agents, silicone compounds, fats, waxes, lecithins, phospholipids, UV sun protection factors, or mixtures thereof.

Suitable topical compositions also include ophthalmic solutions, which are intended for application to the conjunctiva, conjunctival sac or eyelids and may be in the form of aqueous solutions, suspensions, emulsions, or reconstitutable powders. The formulation of ophthalmic compositions is well known in the art, and common excipients employed include the vehicle, which is typically water for injection, buffering agents, preservatives, tonicity agents, viscosity modifiers, surfactants and stabilizers.

In one embodiment, the pharmaceutical dosage form comprising compacted quercetin of the present invention and at least one pharmaceutically acceptable excipient is a topical composition selected from the group consisting of lotions, liniments, tinctures, creams, gels, ointments, pastes, and ophthalmic solutions, preferably selected from lotions, creams and ophthalmic solutions.

The dose of quercetin contained in each unit dose may widely vary depending on the route of administration and the therapeutic or cosmetic indication. The skilled in the art can easily adjust the most suitable amount of quercetin for each type of composition and use.

For example, in oral dosage forms, each unit dose typically comprises from about 200 to about 1000 mg, preferably from about 250 to about 500 mg of quercetin.

Use

Another aspect of the present invention relates to a pharmaceutical dosage form comprising the high-density quercetin of the present invention for use in therapy.

Another aspect of the invention is a method of treating a disease or condition susceptible to treatment with quercetin in a subject, the method comprising administering a pharmaceutical dosage form comprising the high-density quercetin of the present invention to the subject.

The terms "treatment", "treating" or "therapy" as used herein have their conventional meaning and typically refer to the administration of the pharmaceutical dosage form with the purpose of attenuating, alleviating, minimising, inhibiting the progression, or suppressing the symptoms of the treated disease or condition, or for stimulating the recovery after said disease or condition. Furthermore, the treatment is also meant to include the preventive aspect, i.e., the administration of the quercetin containing pharmaceutical dosage form to a subject suspected or prone to suffer from a specific disease or condition in order to prevent the onset of such disease or condition. The pharmaceutical dosage form comprising compacted quercetin for use in therapy, according to this aspect of the invention, is meant therefore to include the treatment and/or prevention of any disease or condition susceptible to be treated or prevented with quercetin.

Quercetin has been disclosed to have a wide range of health benefits, which make it suitable for different therapeutic uses, including the treatment of cardiovascular diseases, metabolic diseases and cancer, for example, as disclosed in the book chapter Park J. B., Quercetin, in: Encyclopedia of Dietary Supplements, Second Edition, Coates P. M. et al., Editors, Informa UK, 2010, 656-664. Among the therapeutic indications of quercetin are the treatment of asthma, inflammation, hypertension, coronary heart disease, stroke, prostate cancer, breast cancer, brain cancer, colorectal cancer, gastric cancer, leukemia, ovarian cancer, diabetes, obesity, hyperlipidemia, nonalcoholic fatty liver disease, metabolic syndrome, osteoporosis, rheumatoid arthritis, inflammatory bowel disease, multiple sclerosis, systemic lupus erythematosus, neurodegenerative diseases including Parkinson's disease and Alzheimer's disease, neurological diseases, ophthalmic diseases, viral infections, skin diseases including atopic dermatitis, stomatitis, interstitial cystitis and prostatitis, among others, as disclosed, for example, in Kelly G. S., Quercetin. Monograph., Altern. Med. Rev., 2011, 16 (2), 172-94. Regarding the use of quercetin for treating viral infections, its use for the prevention and treatment of SARS-CoV-2 related disease (COVID-19) is also included (as disclosed in Manjunath et al., Antiviral, immunomodulatory, and anticoagulant effects of quercetin and its derivatives: Potential role in prevention and management of COVID-19, J. Pharm. Anal., 2022, 12 (1), 29-34 or in Colunga et al., Quercetin and Vitamin C: An Experimental, Synergistic Therapy for the Prevention and Treatment of SARS-CoV-2 Related Disease (COVID-19), Front. Immunol., 2020, 11, 1451).

The therapeutically effective dose of quercetin widely varies depending on the therapeutic indication, the route of administration, the severity of the condition, and the age of the patient. The recommended dose typically ranges from about 100 to about 1000 mg/day (see for example, Kelly G. S. op. cit.). The expert practitioner will have no difficulty in selecting the most appropriate dosage in each case.

Another aspect of the invention is the cosmetic use of a composition comprising high-density quercetin.

The "cosmetic use" is related to beautify and/or improve the appearance of normal, non-diseased skin. Due to its antioxidant activity, quercetin is useful in retardation skin aging and wrinkling and may be used as a cosmetic ingredient, generally in topical formulations, as disclosed, for example, in Hatahet et al., Quercetin topical application, from conventional dosage forms to nanodosage forms, Eur. J. Pharm. Biopharm., 2016, 41-53.

Either for use in therapy or as cosmetic, quercetin may be administered alone, i.e., as the only active ingredient of the composition, or combined with other active ingredients, either in the same composition, as a fixed-dose combination, or in combination with other pharmaceutical/cosmetic/dietetic formulations.

The invention is defined by the following embodiments:
1.—A process for preparing high-density quercetin comprising roller compaction of quercetin, wherein both the high-density quercetin and the quercetin starting material have a purity of at least 95%.

2.—The process according to embodiment 1, characterized in that quercetin is non-solvated and non-hydrated.

3.—The process according to embodiment 1, characterized in that quercetin is a hydrated form, preferably selected from quercetin monohydrate and quercetin dihydrate, more preferably is quercetin dihydrate.

4.—The process according to any one of embodiments 1 to 3, characterized in that the purity is of at least 95.5%, preferably of at least 96.0%, more preferably of at least 96.5%, still more preferably of at least 97.0%, still more preferably of at least 97.5%, still more preferably of at least 98.0%, still more preferably of at least 98.5%, still more preferably of at least 99.0%, and still more preferably of at least 99.5%, or about 100%.

5.—The process according to any one of embodiments 1 to 4, characterized in that the roll speed is adjusted to a value comprised between 0.5 rad/s and 3.7 rad/s, preferably comprised between 0.5 rad/s and 2.0 rad/s, more preferably comprised between 0.7 rad/s and 1.6 rad/s, and still more preferably comprised between 1.0 rad/s and 1.3 rad/s, for example, is selected from about 1.0 rad/s, about 1.1 rad/s, about 1.2 rad/s and about 1.3 rad/s.

6.—The process according to any one of embodiments 1 to 5, characterized in that the gap between the rollers is adjusted to a value comprised between 0.2 mm and 2 mm, preferably comprised between 0.2 mm and 1.5 mm, more preferably comprised between 0.3 mm and 1.0 mm, still more preferably comprised between 0.4 mm and 0.8 mm, and still more preferably comprised between 0.4 mm and 0.6 mm, for example is selected from about 0.4 mm, about 0.5 mm, about 0.6 mm, about 0.7 mm and about 0.8 mm, and preferably is about 0.5 mm.

7.—The process according to any one of embodiments 1 to 6, characterized in that the roll force is adjusted to a value comprised between 50 kN and 200 kN, preferably between 70 kN and 170 kN, more preferably between 100 kN and 155 kN, still more preferably between 120 kN and 145 kN, and still more preferably between 125 kN and 140 kN.

8.—The process according to any one of embodiments 1 to 7, characterized in that the roll force per unit of roller length is adjusted to a value comprised between 1 kN/cm and 40 kN/cm, preferably comprised between 5 kN/cm and 35 kN/cm, more preferably comprised between 10 kN/cm and 30 kN/cm, still more preferably comprised between 15 kN/cm and 25 kN/cm, still more preferably comprised between 16 kN/cm and 22 kN/cm, and still more preferably comprised between 17 kN/cm and 20 kN/cm.

9.—High-density quercetin obtainable with a process according to any one of embodiments 1 to 8.

10.—The high-density quercetin according to claim 9, characterized in that it has a bulk density of more than 0.45 g/ml, preferably of more than 0.50 g/ml, more preferably of more than 0.55 g/ml, and still more preferably of more than g/ml.

11.—The high-density quercetin according to claim 9, characterized in that it has a bulk density comprised between 0.45 g/ml and 0.80 g/ml, preferably comprised between 0.50 g/ml and 0.80 g/ml, more preferably comprised between g/ml and 0.80 g/ml, more preferably comprised between 0.55 g/ml and 0.75 g/ml, still more preferably comprised between 0.60 g/ml and 0.75 g/ml, and still more preferably comprised between 0.60 g/ml and 0.70 g/ml.

12.—The high-density quercetin according to any one of embodiments 9 to 11, characterized in that it has a particle size equal to or less than 2000 microns, preferably equal to or less than 1800 microns, more preferably equal to or less than 1600 microns, still more preferably equal to or less than 1400 microns, still more preferably equal to or less than 1200 microns, and still more preferably equal to or less than 1000 microns, determined by sieving.

13.—The high-density quercetin according to any one of embodiments 9 to 12, characterized in that it has a particle size comprised between 400 microns and 2000 microns, preferably comprised between 500 microns and 1500 microns, more preferably comprised between 600 microns and 1200 microns, and still more preferably comprised between 700 microns and 1000 microns, determined by sieving.

14.—Use of high-density quercetin according to any one of embodiments 9 to 13 for the preparation of a pharmaceutical dosage form.

15.—A pharmaceutical dosage form comprising high-density quercetin according to any one of embodiments 9 to 13 and, optionally, at least one pharmaceutically acceptable excipient and/or vehicle.

16.—The pharmaceutical dosage form according to embodiment 15, characterized in that it is an oral dosage form selected from tablets, capsules, powders or granules, solutions, suspensions and syrups.

17.—The pharmaceutical dosage form according to embodiment 16, characterized in that it is selected from tablets, granules and capsules.

18.—The pharmaceutical dosage form according to embodiment 17, characterized in that it contains at least 70 wt % quercetin, preferably at least 75 wt % quercetin, more preferably at least 80 wt % quercetin, still more preferably at least 85 wt % quercetin, still more preferably at least 90 wt % quercetin, and still more preferably at least 95% quercetin.

19.—The dosage form according to any one of embodiments 15 to 18 for use in therapy.

20.—Cosmetic use of the dosage form according to any one of embodiments 15 to 18.

Next, some examples are provided with the purpose of illustrating the invention, but not limiting it.

EXAMPLES

Example 1.—Preparation of High-Density Quercetin

Compacted, high-density quercetin was prepared according to the process of the present invention, using conventional, commercial quercetin as starting material (CellMark, obtained from the buds of *Sophora Japonica* L.).

The commercial quercetin starting material was a yellow powder, with a specification of at least 95% purity, determined by HPLC.

The purity of quercetin before and after the compaction process was assessed by HPLC. The HPLC specifications used were as follows:

Equipment: 1220 Infinity LC-DAD (Agilent Technologies).
Column: ACE3 C18 PFP (150×4.6 mm)
Flow rate: 1 ml/min
Injection volume: 5 µl
Detector: 360 nm
Run time: 15 minutes
Solvent: methanol/acetonitrile/phosphoric acid
Retention time: 3.28

For the compaction process, a roller compactor equipment was used (Bonals BC-150/75V), with vacuum system for feeding the raw material into the screw feeding system and with a refrigerating system. The roller compactor had one roll with smooth surface and one roll with knurled surface. The dimensions of both rolls were 10.5 cm diameter and 7.4 cm width.

The roll speed in the roller compactor was about 10-12 r.p.m. Screw feeding speed was 30-40 r.p.m., roll force was set to 17.2-19.2 kN and the roll gap was fixed to 0.5 mm.

The roller compactor used allowed a continuous control of the temperature of the roll surface and had an internal refrigeration circuit, with a circulating refrigeration fluid whose flow could be regulated in order to adjust said temperature to the desired value. The temperature was kept under 50° C. during the process.

The compactor was connected to a rotor granulator for milling the outcoming compacted plaque. The granulation speed was set to 100-200 r.p.m. and the obtained granulate was passed through a sieve of 1 mm opening.

In the compacted quercetin obtained, therefore, 100% of the particles passed through a sieve of 1000 micron size.

Example 2.—Flowability Parameters of the Compacted Quercetin Prepared in Example 1

Some properties of the compacted quercetin granules prepared in Example 1 are shown below in Table 2, and are compared to those of non-compacted quercetin starting material:

TABLE 2

| Property | Non-compacted quercetin (starting material) | Compacted quercetin (Example 1) |
|---|---|---|
| Aspect | Yellow powder with damp, agglomerated appearance | Yellow granules without agglomerates, highly flowable |
| Quercetin content (purity) | 99.80% | 99.78% |
| Bulk density | 0.21 g/ml | 0.65 g/ml |
| Tapped density | 0.44 g/ml | 0.71 g/ml |
| Compressibility (Carr Index) | 52.27 | 8.45 |
| Hausner ratio | 2.10 | 1.09 |
| Angle of repose | >45° | 25-30° |

The quercetin content (purity) of quercetin starting material and compacted quercetin was determined by HPLC, using the parameters disclosed above in Example 1. A purity of more than 99% was maintained after the compaction process.

The bulk density was measured using a PT-SV100 Scott Volumeter (Pharma Test) and the tapped density was measured using a PT-TD200 Tap Density Tester (Pharma Test).

Carr index was calculated from the bulk and tapped density measured values, using the following formula:

$$\text{Carr index} = \frac{\text{Density (tapped)} - \text{Density (bulk)}}{\text{Density (tapped)}} \times 100$$

Hausner ratio was also calculated using bulk and tapped density values, according to the following formula:

$$\text{Hausner ratio} = \frac{\text{Density (tapped)}}{\text{Density (bulk)}} \times 100$$

The angle of repose was determined by measuring the radius and the height of the cone formed after pouring the powder, using the formula $\tan^{-1}$ (height/radius).

Figure 2:

FIG. 1 shows a picture of non-compacted quercetin powder starting material and FIG. 2 shows a picture of compacted quercetin granules after the process of the invention. It can be observed that the non-compacted material has damp and agglomerated appearance, whereas the compacted product has non-agglomerated, flowable appearance.

Example 3.—Preparation of Quercetin Capsules with Non-Compacted and Compacted Quercetin A comparative assay was performed for the manufacture of two types of quercetin capsules, comprising the same amount of quercetin and also the same amount of excipient, but using either non-compacted, standard, commercially available quercetin (the same used as starting material in Example 1) or the compacted granular quercetin prepared in Example 1.

In particular, hard gelatin capsules of 250 mg strength were prepared using the ingredients listed in Table 3:

TABLE 3

| Ingredient | Amount per capsule |
|---|---|
| Quercetin | 250 mg |
| Magnesium stearate (lubricant) | 13 mg |

All ingredients were added to a V Blender, blended during 15 minutes, and filled into capsules of 0 size using a Sejong capsule filler.

When compacted quercetin was used as active ingredient, the manufacture of the capsules was more efficient, due to its better flowability, so quercetin did not adhere to the walls of vessels and mixers, there were no loses of active ingredient and homogeneous pre-formulation mixture was easily achieved, without segregation of the ingredients.

Conversely, the manufacture of the capsules with non-compacted quercetin was less efficient in terms of product losses (industrial yield), operational yield and production and cleaning time, as shown in Table 4 below:

TABLE 4

| Property | Non-compacted quercetin | Compacted quercetin |
|---|---|---|
| Industrial yield | 87% | 100% |
| Operational yield (Capsules/hour) | 23500 | 35100 |
| Production time (hours) | 29 | 16 |
| Cleaning time (hours) | 9 | 3 |

Furthermore, using the same operational parameters in the manufacturing process, the capsules obtained using the compacted quercetin granules of Example 1 showed better weight and content uniformity, as shown in Table 5 below:

TABLE 5

| Property | Non-compacted quercetin | Compacted quercetin |
| --- | --- | --- |
| Weight uniformity (%) | 93.0 | 99.8 |
| Content uniformity (%) | 89.0 | 99.6 |

Example 4.—Preparation of Quercetin Capsules with Compacted Quercetin without Excipients 500 mg strength quercetin capsules were prepared using the compacted quercetin granules of Example 1, without the addition of any pharmaceutical excipient.

To this end, 500 mg of the compacted quercetin granules were filled into capsules of 00 size using a Sejong capsule filler.

The obtained capsules had a weight uniformity of more than 99%.

Example 5.—Preparation of Quercetin Tablets Through Direct Compression

First, compacted quercetin granules were prepared following an analogous procedure as described in Example 1, but using commercial quercetin obtained from Fava d'Anta tree (*Dimorphandra* spp) as starting material.

500 mg strength quercetin tablets were prepared using those compacted quercetin granules, without the addition of any pharmaceutical excipient. 500 mg of compacted quercetin granules were used in each tablet using a Fette 3090i compacting equipment.

The obtained tablets had a weight uniformity of more than 99%. Furthermore, they showed optimal hardness and low friability.

The invention claimed is:

1. A process for preparing high-density quercetin comprising roller compaction of quercetin,
   wherein both the high-density quercetin and the quercetin starting material have a purity of at least 95%,
   wherein the high-density quercetin has a bulk density of more than 0.50 g/ml and a Carr index below 15,
   wherein the high-density quercetin is in granules, and
   wherein a roll speed for the roller compaction is in a range from 1-1.6 rad/s.

2. The process according to claim 1, wherein the purity is at least 96%.

3. The process according to claim 2, wherein the roll speed is adjusted to a value between 1 rad/s and 1.3 rad/s.

4. The process according to claim 1, wherein the gap between the rollers is adjusted to a value between 0.2 mm and 2 mm.

5. The process according to claim 1, wherein the roll force is adjusted to a value between 50 kN and 200 kN.

6. The process according to claim 1, wherein the roll force per unit of roller length is adjusted to a value comprised between 1 kN/cm and 40 kN/cm.

7. The process according to claim 1, wherein the purity is at least 98%.

8. The process according to claim 1, wherein the roll speed is adjusted to a value of 1-1.3 rad/s.

9. The process according to claim 1, wherein the gap between the rollers is adjusted to a value between 0.4 mm and 0.8 mm.

10. The process according to claim 1, wherein the roll force is adjusted to a value between 120 kN and 145 kN.

11. The process according to claim 1, wherein the roll force per unit of roller length is adjusted to a value between 10 kN/cm and 30 kN/cm.

* * * * *